United States Patent [19]

Tunison, III et al.

[11] Patent Number: 5,348,163
[45] Date of Patent: Sep. 20, 1994

[54] METHOD AND APPARATUS FOR SEPARATING FINE PARTICLES

[75] Inventors: Donald E. Tunison, III, Tuscola; Stephanie E. Church, Champaign; Gregory W. Leman, Savoy; Carl L. Troike, Jr., Tuscola, all of Ill.

[73] Assignee: Cabot Corporation, Boston, Mass.

[21] Appl. No.: 6,359

[22] Filed: Jan. 19, 1993

[51] Int. Cl.$^5$ .............................................. B07B 4/00
[52] U.S. Cl. .................................... 209/135; 209/143
[58] Field of Search ................ 209/135, 142, 143, 144

[56] References Cited

U.S. PATENT DOCUMENTS

| | | |
|---|---|---|
| 272,475 | 2/1883 | Prinz . |
| 901,474 | 10/1903 | Richards . |
| 1,146,624 | 7/1915 | Huber . |
| 1,272,311 | 7/1918 | Plaisted . |
| 1,457,110 | 5/1923 | Gay . |
| 1,581,241 | 4/1926 | Stebbins . |
| 1,660,682 | 2/1928 | Stebbins . |
| 1,801,195 | 4/1931 | Fraser . |
| 1,897,367 | 2/1933 | Eldridge ............................ 209/143 |
| 1,986,301 | 1/1935 | Stockton .......................... 209/143 |
| 2,022,585 | 11/1935 | Chance . |
| 2,214,434 | 9/1940 | Nelms .............................. 209/135 |
| 2,278,092 | 3/1942 | Pearce ........................... 209/143 X |
| 2,446,140 | 7/1948 | McGee . |
| 2,461,584 | 2/1949 | Anderson et al. . |
| 2,561,396 | 7/1951 | Matheson . |
| 2,634,858 | 4/1953 | Vahey et al. . |
| 2,683,685 | 7/1951 | Matheson . |
| 2,850,162 | 9/1958 | Widmer ......................... 209/143 X |
| 2,870,001 | 1/1959 | Giusti et al. . |
| 2,968,069 | 1/1961 | Powell ........................... 209/135 X |
| 2,968,400 | 1/1961 | Clute . |
| 3,104,155 | 9/1963 | Lewis . |
| 3,113,099 | 12/1963 | Schmitz ............................. 209/135 |
| 3,288,285 | 11/1966 | Walker et al. . |
| 3,349,912 | 10/1967 | Eveson et al. . |
| 3,362,531 | 1/1968 | Johnson et al. . |
| 3,397,780 | 8/1968 | Beuzeval ........................... 209/143 X |
| 3,426,893 | 2/1969 | Stark . |
| 3,482,692 | 12/1969 | Postma ............................. 209/135 X |
| 3,865,242 | 2/1975 | Musto . |
| 3,878,091 | 4/1975 | Hukki . |
| 3,883,423 | 5/1975 | Turner . |
| 4,055,486 | 10/1977 | Choi et al. . |
| 4,125,456 | 11/1978 | Henderson . |
| 4,132,634 | 2/1979 | Rumpf et al. . |
| 4,153,541 | 5/1979 | Rumpf et al. . |
| 4,159,941 | 7/1979 | Avery, Jr. . |
| 4,169,714 | 10/1979 | Calvert . |
| 4,278,532 | 7/1981 | Birch et al. . |
| 4,299,693 | 11/1981 | Paulson . |
| 4,299,694 | 4/1980 | Goodell . |
| 4,431,530 | 2/1984 | Syben . |
| 4,657,667 | 4/1987 | Etkin .................................. 209/135 |
| 4,715,951 | 12/1987 | Krambrock et al. . |
| 4,743,363 | 5/1988 | Darrow . |
| 4,782,001 | 11/1988 | Kanda et al. ................... 209/135 X |
| 4,832,700 | 5/1989 | Kaspar et al. . |
| 4,946,044 | 8/1990 | Havrilla . |

*Primary Examiner*—D. Glenn Dayoan
*Attorney, Agent, or Firm*—Michelle B. Lando

[57] ABSTRACT

A method for separating fine particles from contaminant particles suspended in a gaseous medium. The method includes introducing a particle suspension at a predetermined velocity into a vessel having a top and bottom portion, each portion having a discharge outlet. The particle suspension is then directed into an impingement plate, which is arranged within the vessel at a predetermined angle. The impingement plate is angled to achieve uniform distribution of the particle suspension within the vessel after impact with the plate. The fine particles will rise to the top portion of the vessel, and the contaminant, as well as residual fine particles, will settle to the bottom of the vessel. The fine particles and contaminant and residual fine particles are removed from the top and bottom discharge outlets respectively.

31 Claims, 3 Drawing Sheets

METHOD AND APPARATUS FOR SEPARATING FINE PARTICLES

BACKGROUND OF THE INVENTION

1. Field of the Invention

The present invention pertains to an improved method and system for separating fine particles from contaminant particles suspended in a gaseous medium and, more particularly, to a method for separating fumed silica from contaminant particles.

2. Description of the Prior Art

Many industrial processes use particulate material either as a feed or product. Commonly, there are specifications on particle size distributions to control the solution rate, mixing behavior and segregation, optical properties, smoothness, and dustiness. Materials having a particle diameter of less than 45.0 microns (325 mesh) are commonly employed as fillers or reinforcing agents to improve the physical properties of compositions including rubbers, coatings, adhesives, paints and sealants. In particular, materials having a nominal particle diameter of between about 1.0 to about 45.0 microns are used in this manner. Examples of these materials include, but are not limited to, fumed silicas, precipitated silicas, fumed alumina, zinc oxide fume and carbon black.

Several methods have been developed to control the particle size distribution. For example, it is known to use air classifiers, fluidized beds, or rotary classifiers to separate particulate material based on particles sizes and/or densities. Several different methods and apparatuses for separating particulate materials from a mixture in gas streams are described in Henderson, U.S. Pat. No. 4,125,456, separating grit from carbon black, Matheson in U.S. Pat. No. 2,561,396, separating mixtures of particles having different sizes, Huber in U.S. Pat. No. 1,146,624, separating a stream of coarse and fine particles having substantially the same specific gravity, and Goodell in U.S. Pat. No. 4,299,694, separating fine char from discharge waste of coal-fired direct reduction process. Each of these prior art processes generally operate by introducing a mixture of particles into an upwardly flowing air stream which lifts the lighter particles and allows the heavier particles to fall by gravity into a hopper. Stebbins, U.S. Pat. No. 1,660,682, similarly teaches that fine dust-like particles can be separated from heavier particles by air blasting the particulate mixture into a chamber wherein the lighter particles will be carried out of the direct path of the air blast by expansion of the air.

Alternatively, processes have been developed utilizing a baffle, or impingement plate, to deflect particles in a gas stream. For example, Musto, U.S. Pat. No. 3,865,242, teaches an apparatus for classifying particulate matter of different densities entrained in a fluid flow stream. The apparatus includes a bend section of a duct system in which the particles are concentrated, and a baffle disposed immediately downstream of the bend section which is operative to deflect the particles transversely across the path of the gas component. A similar device is described in Clute, U.S. Pat. No. 2,968,400, wherein a separator for comminuted materials of different specific gravities utilizes a continuous air flow system as well as a swingable and a stationary baffle. Another method and apparatus for classifying and separating components of a particulate solid substance carried in a gaseous medium is disclosed in Stark, U.S. Pat. No. 3,426,893, wherein a mixture of solid substances is carried in a continuously moving gas stream and is stripped of fine particles as it moves along a series of chambers into an expansion zone, thereby avoiding the use of a complicated apparatus.

Unfortunately, there is no universal device to select exactly the desired particle size fraction for a particular feed or product, and problems such as high contaminant levels, high solids losses, and high operating costs make selection and operation of classifiers difficult. These problems are compounded when separation of extremely fine particles is required.

As previously discussed, one example of a material having a particle diameter less than about 45.0 microns is fumed silica. Fumed silica, a well known additive commonly employed to improve the physical properties of various compositions, comprises fine silicon dioxide particles generally having a particle diameter of between about 1.0 to about 45.0 microns and a bulk density of about 10.0 lbs/ft$^3$ or less.

It is desired, therefore, to develop an improved method for separating fine particles from contaminant particles suspended in a gaseous medium. More particularly, it is desired to develop a method for separating fumed silica from contaminant particles suspended in a dilute phase gas stream.

It is therefore an object of the present invention to provide an improved method for separating fine particles from contaminant particles suspended in a gaseous medium. It is a further object of the present invention to provide a method for separating fumed silica having a nominal particle diameter of between about 1.0 to about 45.0 microns from contaminant particles suspended in a dilute phase gas stream.

SUMMARY OF THE INVENTION

According to the present invention, there is provided a method for separating fine particles from contaminant particles suspended in a gaseous medium. The method includes introducing a particle suspension at a predetermined velocity into a vessel having a top and bottom portion, each portion having a discharge outlet. The particle suspension is then directed into an impingement plate, which is arranged within the vessel at a predetermined angle. The angle of the impingement plate allows for the particle suspension to be uniformly distributed within the vessel after impact with the plate. The fine particles will rise to the top portion of the vessel, and the contaminant, as well as residual fine particles, will settle to the bottom of the vessel. The fine particles and contaminant and residual fine particles are removed from the top and bottom discharge outlets respectively.

The system for separating fine particles from contaminant particles suspended in a gaseous medium includes a means for transporting the particle suspension at a predetermined velocity into a vessel. The vessel has a top and bottom portion, each of which portion has a discharge outlet. An impingement plate is arranged within the vessel at a predetermined angle that achieves uniform distribution of the particle suspension within the vessel, after impact with the plate. Lastly, the system includes means for removing the fine particles and contaminant and residual fine particles.

For example, the method of the present invention can be used for separating fumed silica having a nominal particle diameter of between about 1.0 to about 45.0 microns from contaminant particles suspended in either a dilute or dense phase gas stream. The method includes introducing the gas stream at a predetermined velocity into a vessel having a top and bottom portion, each portion having a discharge outlet. The gas stream is then directed into an impingement plate, which is arranged within the vessel at a predetermined angle of between 0° to 90° relative to the central axis of the vessel. The angle of the impingement plate allows for the gas stream to be uniformly distributed within the vessel after impact with the plate. After impact, the fumed silica rises to the top portion of the vessel, and the contaminant, as well as residual fumed silica, settles to the bottom of the vessel. The velocity of the gas stream may be adjusted with known means in order to achieve an overall bulk gas velocity within the vessel of between about 5.0 to about 20.0 ft/min. The fumed silica and contaminant and residual fumed silica are removed from the top and bottom discharge outlets, respectively.

BRIEF DESCRIPTION OF THE DRAWINGS

The foregoing and other objects and advantages will be more fully appreciated from the following drawings in which.

DETAILED DESCRIPTION OF THE INVENTION

The present invention is directed to a method for separating fine particles from contaminant particles suspended in a gaseous medium.

Figure 1:
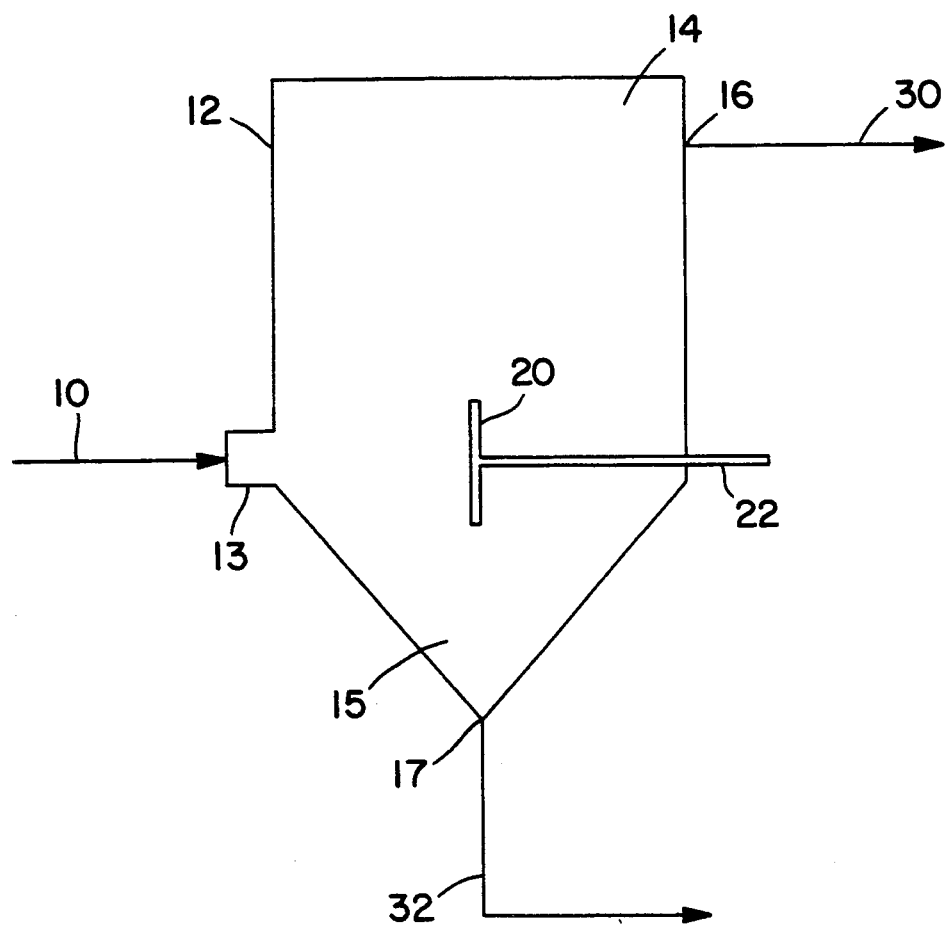
FIG. 1 illustrates a process flow diagram of the vessel and impingement plate arrangement utilized in the present invention.
Figure 2A:
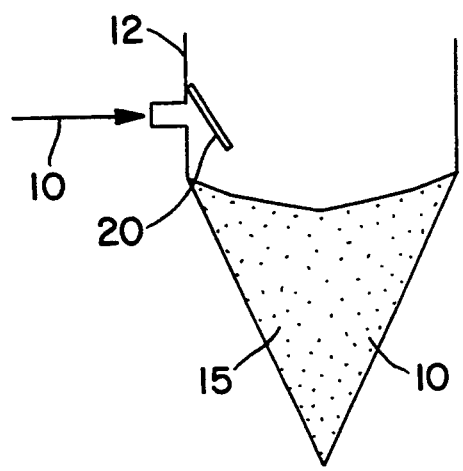
FIGS. 2A and 2B illustrate alternative impingement plate arrangements utilized in the present invention.
Figure 2B:
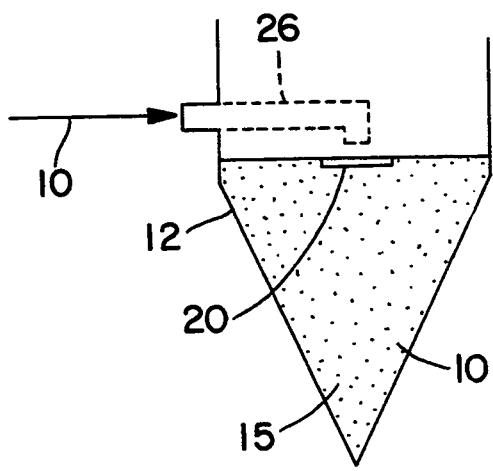
Figure 3:
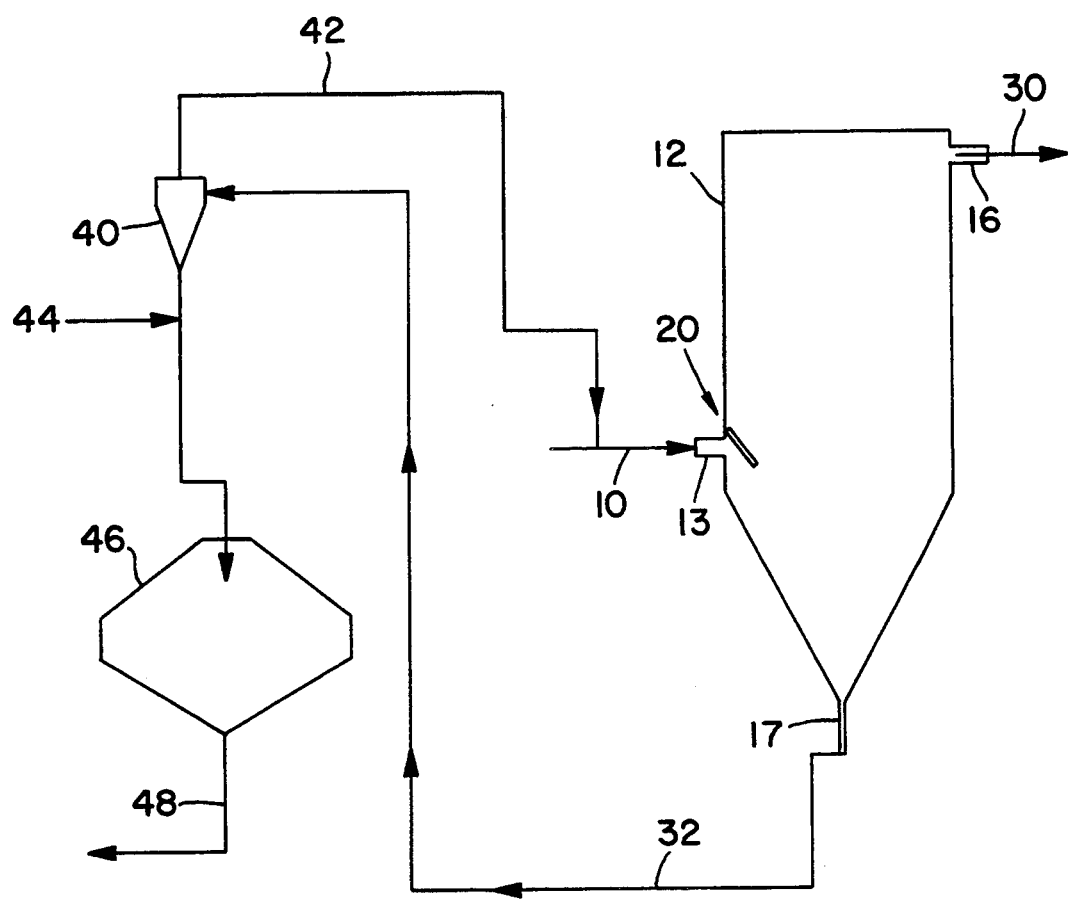
FIG. 3 illustrates an overall process flow diagram of the present invention.

Referring to FIG. 1, the method of the present invention includes introducing a particle suspension 10 into a vessel 12 through inlet 13. Vessel 12 is typically cylindrically shaped, and has a top portion 14 and a conical bottom portion 15 with sloping side walls at approximately 60° angles. Each portion has a respective discharge outlet 16, 17. An impingement plate 20 is arranged within vessel 12 at a predetermined angle depending upon the particle sizes and flow rates of particle suspension 10. The angle of plate 20 allows for particle suspension 10 to be uniformly distributed within the vessel after impact with the plate. Impingement plate 20 can be attached to a plate rod 22 by any conventional means. Plate rod 22 allows for operator adjustment of the distance of plate 20 from inlet 13 from the exterior of vessel 12.

As noted, particle suspension 10 will be uniformly distributed within vessel 12 upon impact with plate 20. The fine particles then rise to top portion 14. The contaminant particles, and residual fine particles, settle to the bottom portion 15 of vessel 12. A fine particle stream 30 is removed through top discharge outlet 16 for packaging or further processing, while contaminant and residual fine particle stream 32 is removed through bottom discharge outlet 17 for disposal or further separation.

Particle suspension 10 is typically comprised of a mixture of fine and contaminant particles in a gaseous medium. Typically, the fine particles have a particle diameter of less than about 45.0 microns (325 mesh size). Additionally, the fine particles typically have a bulk density of less than 10 lbs/ft$^3$. The contaminant particles are generally comprised of relatively large, particles coarse agglomerated particles, reaction by-products, extra-process materials, and/or unreacted raw materials. Generally, the contaminant particles, sometimes referred to as grit, have a particle size and bulk density greater than the fine particles. Examples of several fine particles which can be separated from contaminant particles suspended in a gaseous medium include, but are not limited to, fumed silicas, precipitated silicas, fumed alumina, zinc oxide fume and carbon black.

Particle suspension 10 is carried in either a dilute or dense phase gas stream, the stream typically having a velocity greater than 5.0 feet per minute depending upon the specific application and the type of fine particles desired to be separated. Any non-reactive gas can be used as the carrier gas for the fine and contaminant particles, such as nitrogen or air. Preferably, air is used as the carrier gas due to its relative convenience and low cost. The particle suspension 10 is typically transferred directly from a reactor, other process vessel, or storage tank (not shown) into vessel 12. Several conventional methods can be used to create and transport particle suspension 10, including utilizing a fan or blower, a pump, a venturi, or a pneumatic transport system using a compressed gas. Any of the known conventional methods may be appropriately controlled and adjusted by those skilled in the art to achieve the desired transport rate and fluidization of the fine and contaminant particles of particle suspension 10 into vessel 12. Similar particle transfer methods are utilized in the fine particle stream 30, as well as the contaminant and residual fine particle stream 32 to pull the fine and contaminant particles out of vessel 12 for further processing, packaging, or disposal.

The present invention is particularly effective for separating fumed silica from contaminant particles. Fumed silica, such as CAB-O-SIL ® brand fumed silica (registered trademark of Cabot Corporation, Boston, Mass.), is produced by the hydrolysis of silicon tetrachloride vapor in a flame of hydrogen and oxygen. In the combustion process, molten spheres of silica are formed having nominal particle diameters averaging between about 0.007 to 0.027 micron. These molten spheres, termed primary particles, collide and fuse with one another to form branched, three dimensional, chain-like aggregates. As the aggregates cool below the fusion temperature of silica (approximately 1710° C.) further collisions result in some reversible, mechanical entanglement or agglomeration. The agglomerated fumed silica product typically has a nominal particle diameter of less than 45.0 microns and a bulk density of less than 5.0 lbs/ft$^3$. The fumed silica is typically subjected to a calcination process to reduce the hydrogen chloride adsorbed on its surface during the above described production process. After calcination, the fumed silica, and contaminants therein, is suspended in air and pumped to vessel 12.

Typically, the contaminants present in the fumed silica particle suspension include silica and non-silica contaminants, such as metal flake, extra-process materials, fibers, metal oxides, as well as glass and ceramic-like fused silica particles. Typically, there are between 0 to 800 parts per million (PPM), with a mean of 50 PPM, of contaminant particles in the calciner discharge stream (particle suspension 10). Conventional settling velocity calculations are used to determine the smallest particle sizes likely to be collected at any given velocity. As noted earlier, the contaminant particle size and bulk density are, for the most part, greater than 45.0 microns and 10 lbs/ft$^3$, however it is not unusual to collect smaller and lighter particles.

Particle suspension 10 is transported to vessel 12 at a predetermined velocity. Typically, the lowest flow rate must be great enough to fluidize the fumed silica, and can vary with the size and type of silica and operating conditions. The highest flow rate, likewise, depends upon the desired fine particle size and the types of silica and contaminant particles. Preferably, the velocity of particle suspension 10 is appropriately adjusted in order to achieve a bulk gas velocity within the vessel between about 5.0 to about 20.0 feet per minute. The bulk gas velocity is the total gaseous flow of particle suspension 10 in cubic feet per minute divided by the cross sectional area of vessel 12. Most preferably, the bulk gas velocity within the vessel is between about 9.0 to about 14.0 feet per minute.

Particle suspension 10 enters vessel 12 through inlet 13, where it is directed into impingement plate 20. After impact with impingement plate 20, particle suspension 10 is uniformly distributed within vessel 12. As is known to those skilled in the art, the heavy, coarse contaminant particles will exhibit a relatively faster settling velocity than the fine, low density, fumed silica particles, and settle to bottom portion 15. The fumed silica particles will rise to top portion 14 with the carrier gas, where they are removed through top discharge outlet 16, forming the fine particle stream 30. Stream 30 typically includes between 0 to 25 PPM contaminant particles, with a mean of about 5 PPM. Meanwhile, the contaminant particles, as well as a small amount of residual fumed silica, are periodically removed through bottom discharge outlet 17, forming the contaminant and residual particle stream 32.

Impingement plate 20 is arranged within vessel 12 at a predetermined angle of between about 0° to about 90°, relative to the central axis of vessel 12 such that particle suspension 10 will impact a large portion of plate 20. Plate 20 is sized, in any planar geometric shape, larger than the cross-sectional diameter of inlet 13 and the incoming particle suspension 10. Plate 20 is typically held within vessel 12 with a plate rod 22, which provides for operator adjustment of the distance of plate 20 from inlet 13 from the exterior of the vessel. Other methods of mounting plate 20 within vessel 12 include, but are not limited to, adjustable or fixed braces or welding.

Referring to FIGS. 1, 2A and 2B, impingement plate 20 is shown in various positions with vessel 12. As noted above, impingement plate 20 is arranged within vessel 12 at a predetermined angle, depending upon the particle sizes and flow rates of the incoming particle suspension 10. FIG. 1 illustrates a vertical impingement plate 20, angled at 0° relative to the central axis of vessel 12, attached to plate rod 22. The particle suspension 10 is perpendicularly directed into impingement plate 20, which uniformly distributes particle suspension 10 within vessel 12 (not shown).

FIG. 2A illustrates an alternative arrangement of impingement 20. Plate 20 is attached to a wall of vessel 12, above inlet 13, and is angled downwardly such that the incoming particle suspension 10 is directed into bottom portion 15, wherein it is uniformly distributed prior to the settling of the heavier, coarser contaminant particles.

FIG. 2B illustrates an alternative method of introducing the particle suspension 10 into vessel 12, as well as arranging impingement plate 20. A directing conduit, or tube 26 is used to direct particle suspension 10 into the horizontally positioned impingement plate 20. As noted above, impingement plate 20 may be mounted within vessel 12 in any manner known to those skilled in the art. The particle suspension is uniformly distributed in bottom portion 15 after impact with plate 20.

Referring now to FIG. 3, there is illustrated an alternative embodiment of the present invention. The contaminant and residual fine particle stream 32, produced as described above, is introduced into a classifier 40, wherein residual fine particles, such as fumed silica, which have settled with the contaminant particles in vessel 12 are separated from the contaminant particles. Classifier 40 may be a non-mechanical or a mechanical type classifier. A non-mechanical type classifier, such as a cyclone separator, is preferred because of the relative low cost of installation, operation and maintenance. As is known in the art, a cyclone separator operates by introducing a particle-laden gas into a cylindrical or conical chamber tangentially. The heavier and coarser contaminant particles will be discharged through a central bottom discharge outlet, while the lighter, fine particles, such as fumed silica, will exit through the top gas discharge outlet.

As shown in FIG. 3, the residual fine particle stream 42 is recycled to vessel 12, with particle suspension 10, into inlet 13. The overall process within vessel 12 as described above, is repeated as the recycle stream 42 and particle suspension 10 impact impingement plate 20. The particles are uniformly dispersed within vessel 12, where the contaminant particles settle and are removed through bottom discharge outlet 17, while the fine particles rise and are removed through top discharge outlet 16. The contaminant discharge stream 44 leaves classifier 40 through the central bottom discharge outlet, and is fed into a holding tank 46 where it is accumulated before being disposed through disposal stream 48.

As is illustrated above, the present invention teaches an improved method for separating fine particles from contaminant particles in a gaseous medium. By utilizing a system with no moving parts, it provides for a cost effective and efficient contamination removal process which is relatively insensitive to incoming velocities and varying contaminant levels. Finally, the present invention allows for operating flexibility, a low pressure drop, and a lower solids, i.e. fine particle, loss relative to conventional classification.

Although particular embodiments of the invention have been described in detail for purposes of illustration, various modifications may be made without departing from the spirit and scope of the present invention.

What is claimed is:

1. A method for separating fumed silica having a nominal particle diameter of less than about 45.0 microns and a bulk density of less than about 10.0 lbs/ft$^3$ from contaminant particles, having a particle diameter and bulk density greater than said fumed silica, suspended in a gas stream comprising:

introducing said gas stream at a predetermined velocity into a vessel having a top and bottom portion, each said portion having a discharge outlet;

directing said gas stream into an impingement plate, said plate arranged within said vessel at a predetermined angle, said angle being such that said gas stream is uniformly distributed within said vessel after impact with said plate;

wherein said fumed silica rises to said vessel top portion, and said contaminant particles and residual fumed silica settles to said vessel bottom portion;

removing said fumed silica through said top discharge outlet; and removing said contaminant particles and residual fumed silica through said bottom discharge outlet.

2. The method of claim 1 further comprising the step of:

introducing said contaminant particles and residual fumed silica to a classifier to separate said residual fumed silica which settled with said contaminant particles in said vessel;

recycling said residual fumed silica to said vessel; and discharging said contaminant particles.

3. The method of claim 2 wherein said classifier is a rotary classifier.

4. The method of claim 1 wherein said fumed silica has a nominal particle diameter of between about 1.0 to about 45.0 microns.

5. The method of claim 1 wherein said fumed silica has a bulk density of less than about 5.0 lbs/ft$^3$.

6. The method of claim 1 wherein said fumed silica and said contaminant particles are suspended in a dilute phase gas stream.

7. The method of claim 1 wherein said fumed silica and said contaminant particles are suspended in a dense phase gas stream.

8. The method of claim 6 wherein said gas stream has a bulk velocity within said vessel between about 5.0 to about 20.0 feet per minute.

9. The method of claim 7 wherein said gas stream has a bulk velocity within said vessel between about 5.0 to about 20.0 feet per minute.

10. The method of claim 8 wherein the bulk velocity within said vessel is between about 9.0 to about 14.0 feet per minute.

11. The method of claim 9 wherein the bulk velocity within said vessel is between about 9.0 to about 14.0 feet per minute.

12. The method of claim 1 wherein said impingement plate is arranged within said vessel at a predetermined angle of between 0° to 90° relative to the central axis of said vessel.

13. A method for separating fumed silica having a nominal particle diameter of less than about 45.0 microns and a bulk density of less than about 10 lbs/ft$^3$ from contaminant particles, having a particle diameter and bulk density greater than said fumed silica, suspended in a gas stream comprising:

introducing said gas stream at a predetermined velocity of greater than 5.0 feet per minute into a vessel having a top and bottom portion, each said portion having a discharge outlet;

directing said gas stream into an impingement plate, said plate arranged within said vessel at a predetermined angle, said angle being such that said gas stream is uniformly distributed within said vessel after impact with said plate;

wherein said fumed silica rises to said vessel top portion, and said contaminant particles and residual fumed silica settles to said vessel bottom portion;

removing said fumed silica through said top discharge outlet; and removing said contaminant particles and residual fumed silica through said bottom discharge outlet.

14. The method of claim 13 further comprising the step of:

introducing said contaminant particles and residual fumed silica to a classifier to separate said residual fumed silica which settled with said contaminant particles in said vessel;

recycling said residual fumed silica to said vessel; and discharging said contaminant particles.

15. The method of claim 14 wherein said classifier is a rotary classifier.

16. The method of claim 13 wherein said fumed silica has a nominal particle diameter of between about 1.0 to about 45.0 microns.

17. The method of claim 13 wherein said fumed silica has a bulk density of less than about 5.0 lbs/ft$^3$.

18. The method of claim 13 wherein said fumed silica and said contaminant particles are suspended in a dilute phase gas stream.

19. The method of claim 13 wherein said fumed silica and said contaminant particles are suspended in a dense phase gas stream.

20. The method of claim 18 wherein said gas stream has a bulk velocity within said vessel between about 5.0 to about 20.0 feet per minute.

21. The method of claim 19 wherein said gas stream has a bulk velocity within said vessel between about 5.0 to about 20.0 feet per minute.

22. The method of claim 20 wherein the bulk velocity within said vessel is between about 9.0 to about 14.0 feet per minute.

23. The method of claim 21 wherein the bulk velocity within said vessel is between about 9.0 to about 14.0 feet per minute.

24. The method of claim 13 wherein said impingement plate is arranged within said vessel at a predetermined angle of between 0° to 90° relative to the central axis of said vessel.

25. A method for separating fumed silica having a nominal particle diameter of less than about 45.0 microns and it bulk density of less than about 10 lbs/ft$^3$ from contaminant particles, having a particle diameter and bulk density greater than said fumed silica, suspended in a gas stream comprising:

introducing said gas stream at a predetermined velocity of greater than about 5.0 feet per minute into a vessel having a top and bottom portion, each said portion having a discharge outlet;

directing said gas stream into an impingement plate, said plate arranged within said vessel at a predetermined angle of between 0° and 90° relative to the central axis of said vessel, said angle being such that said gas stream is uniformly distributed within said vessel after impact with said plate;

wherein said gas stream has a bulk velocity within said vessel of between about 5.0 and about 20.0 feet per minute and said fumed silica rises to said vessel top portion, and said contaminant particles and residual fumed silica settles to said vessel bottom portion;

removing said fumed silica through said top discharge outlet; and removing said contaminant particles and residual fumed silica through said bottom discharge outlet.

26. The method of claim 25 further comprising the step of:

introducing said contaminant particles and residual fumed silica to a classifier to separate said residual fumed silica which settled with said contaminant particles in said vessel;

recycling said residual fumed silica to said vessel; and discharging said contaminant particles.

27. The method of claim 26 wherein said classifier is a rotary classifier.

28. A system for separating fumed silica particles having a nominal particle diameter of less than about 45.0 microns and a bulk density of less than about 10.0 lbs/ft$^3$ from contaminant particles, having a particle diameter and bulk density greater than said fumed silica, suspended in a gaseous medium comprising:

means for transporting said particle suspension at a predetermined velocity into a vessel, said vessel having a top and bottom portion, each said portion having a discharge outlet;

an impingement plate arranged within said vessel at a predetermined angle, said angle being such that said particle suspension is uniformly distributed within said vessel after impact with said plate;

means for removing said fumed silica particles through said top discharge outlet; and means for removing residual fumed silica particles and said contaminant particles through said bottom discharge outlet.

29. The system of claim 28 further comprising:

a classifier having a first and second discharge outlets;

means for directing said residual fumed silica particles and said contaminant particles into said classifier;

means for recycling said residual fumed silica particles into said vessel; and means for discharging said contaminant particles.

30. The system of claim 29 wherein said classifier is a rotary classifier.

31. The system of claim 28 wherein said impingement plate is arranged within said vessel at a predetermined angel of between 0° to 90° relative to the central axis of said vessel.

* * * * *